Jan. 17, 1956     D. B. WHEELER     2,731,379
METHOD OF MAKING HONEYCOMB MATERIAL
Filed April 21, 1953
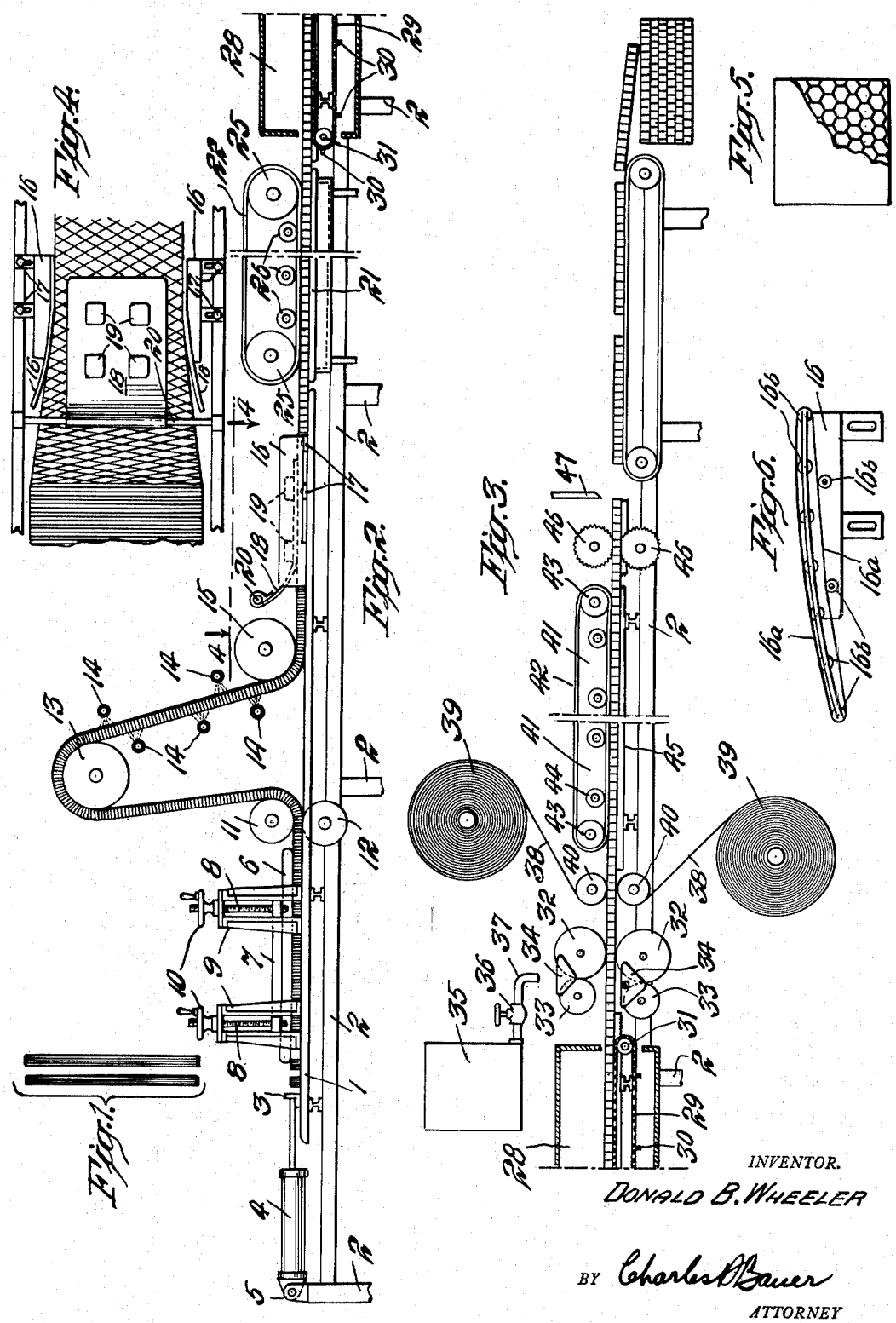
INVENTOR.
DONALD B. WHEELER
BY Charles B. Bauer
ATTORNEY

United States Patent Office 2,731,379
Patented Jan. 17, 1956

2,731,379
METHOD OF MAKING HONEYCOMB MATERIAL

Donald B. Wheeler, Hudson Falls, N. Y., assignor to Union Bag & Paper Corporation, New York, N. Y., a corporation of New Jersey Application April 21, 1953, Serial No. 350,019

10 Claims. (Cl. 154—124)

The present invention relates to improvements in making honeycomb material. More particularly it pertains to a method of and apparatus for joining unexpanded honeycomb packs, expanding these joined packs into one continuous honeycomb structure, facing the structure on one or both sides, and cutting it to the desired size.

The "honeycomb structure" or "honeycomb material," referred to in the specification and claims and shown in the drawing, is made up of a plurality of open-ended cells which may be of any desired size and shape, for example hexagonal, circular, oval or rectangular. Such structure may be formed of any desired material, for example paper, cloth, metal, plastic or the like. The method and apparatus of the present invention are primarily adapted for use on a paper honeycomb structure with the cells having a substantially hexagonal shape, but such method can also be adapted to a honeycomb structure of other material, size and shape. The paper honeycomb structure may be produced by superimposing sheets of paper upon each other until a thick stack is formed, each sheet of this stack being held to the one above it, by adhesive or other means, along spaced and generally parallel lines, with the lines on one side of each sheet between the lines on the other side of such sheet. It will be seen that the distance between such lines determines the cell size. By cutting this stack across the lines holding the sheets together, pieces or packs (shown in Figure 1) may be obtained of a cell length corresponding to the desired thickness of the honeycomb structure. Such pieces or packs must then be expanded into the shape and forms shown in Figure 5. It is an object of the present invention to provide a method of and apparatus for expanding such honeycomb packs more economically and efficiently than under the methods and apparatus now available.

Prior to the present invention such packs were glued together and then pulled into expanded form by hand or in some cases were pulled into expanded form by means of a rack with pins which was mechanically pulled apart to the desired length. In either case each pack or series of packs was done separately and each piece had to be trimmed, causing waste because of the pins or other holding means. Expansion by these methods resulted in a honeycomb structure which was non-uniform. Furthermore, when the honeycomb pack was relatively stiff and resisted expansion, because of impregnation or the nature of the material used, it was necessary that the packs be steamed, expanded, placed on holding racks and then put into a curing oven. It is an object of the present invention to provide a method of and apparatus for performing all the various operations of joining, softening, expanding, curing and setting, facing and cutting during a continuous movement from one end of the method and apparatus to the other. The present invention is so laid out that one or more of these steps or treatments can be omitted, where unnecessary, without affecting such continuous movement.

A further object is to provide a means for joining the packs whereby the joints will be even in thickness so that the packs may be expanded at such joints substantially the same as the rest of the packs, thereby enabling any length piece to be cut and eliminating waste presently caused by expanding in pieces.

A further object is to provide a method and apparatus that will accommodate honeycomb packs of various cell sizes, of different thicknesses, and of varying expansion qualities which may result for different weights of paper or impregnation.

A further object is to provide a more suitable cut-off and slitting means while the honeycomb structure is being processed.

A further object is to provide a method and apparatus of the type described well suited to operate economically and in a practical and efficient manner.

Other objects of the invention will be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawing, in which:

Figure 1 illustrates unexpanded honeycomb packs viewed from the top in the direction of the lines of adhesive on the stacked sheets;

Figures 2 and 3 together schematically illustrate in side elevation apparatus for performing the method of the present invention;

Figure 4 is a plan view on the line 4—4 of Figure 2 illustrating the side pressure unit with the guide roll omitted to show the condition of the pack before the application of side pressure;

Figure 5 is a plan view, partly broken away, of a piece of honeycomb material which has been expanded, faced and cut by the apparatus and method of the present invention;

Figure 6 is a plan view of a modified guide for the side pressure unit shown in Figure 4.

Referring more particularly to the drawing it will be seen that the machine of the present invention is made up of various sections so that the material passing through the machine is in turn compressed, conditioned, expanded, dried, faced, slit and finally cut off. The compression section, which is adapted to receive the honeycomb packs, is made up of a table 1 mounted on a suitable supporting frame 2, as shown in Figure 2. It may be pointed out that this table or some similar support runs virtually the full length of the machine. A back pressure plate 3 slides along the table 1 so that pieces of honeycomb pack, as shown in Figure 1, can be fed onto the table and placed in position in front of the back plate 3. Secured to this plate is the rod of an air cylinder 4, held at one end to the frame by a clevis mount 5, so that compression may be applied against the packs placed on the table. Such air cylinder is actuated by a hand or foot valve, which permits the operator to relieve the pressure on the back plate, thereby permitting successive packs to be inserted into the machine. Each pack is placed on the table with the stripped faces in vertical position and with the smooth faces of the packs butting each other. As shown in Figure 2, the pressure on the back plate has been relieved and there is room to slip additional packs on the table. The face which is to butt against the pack previously inserted is coated with a suitable adhesive before insertion. This results in a continuously joined series of packs so that the machine, when fully loaded, has a continuous honeycomb pack or honeycomb core material from one end of the machine to the other. The series of packs resting on the table are maintained under sufficient pressure for a long enough period of time to bond all the packs on the table into one continuous core.

A series of parallel bars 6 are mounted in spaced relation above the table 1 and apply pressure to the top edges of the honeycomb packs on the table, thus serving to align the edges of the packs and make the joints as uniform as the rest of the joined packs. These bars are affixed to a rectangular frame member 7 which can be raised and lowered to permit insertion of packs of different thickness. The frame member 7 rides up and down along threaded rods 8 rotatably held in side supports 9. At the top ends of the rods are geared hand wheels 10, which permit the frame member and parallel bars to be raised or lowered to afford compression against the edges of the honeycomb packs. The end of the compression section has a pair of upper and lower feed rolls 11 and 12 which serve to hold back the packs approaching such feed rolls against the pressure applied by the air cylinder 4 and also to feed out the continuous pack. Although both of these feed rolls may be rubber extending continuously across the machine, it has been found more satisfactory to use a solid or continuous steel roll at the bottom and a discontinuous rubber roll or series of rubber rolls at the top.

From these feed rolls 11 and 12 the pack is fed upward and over a carry roll 13, which serves two purposes. In the first place, as the pack is fed over the carry roll 13 the upper edges of such pack cover a larger circumference than the lower edges of the pack, which causes the strips to separate and expose the cells at such upper edge. In the second place, by having such carry roll mounted above the feed rolls, the honeycomb pack, upon reaching the opposite side of the roll, moves downwardly by gravity, and the weight of the preceding portion of the pack causes the strips of the pack to open up. Such opening of the pack, both by the weight of the pack itself and the curved path it follows, sufficiently separates the cells so that a jet of steam, emitting from a series of nozzles 14, can be blown into the cells throughout the entire thickness of the pack. Such nozzles can be varied in number, depending on the thickness of the pack and the amount of conditioning required to soften it for expansion.

To return the slightly expanded pack to a horizontal plane, it is passed under a guide roll 15 and back on to the table 1. On top of the table are L-shaped guides 16, the upper curved vertical portions of which apply side pressure to the honeycomb pack as it moves over the table and the lower horizontal portions of which rest on the table. Such pressure is dependent on the distance between the guides, which distance may be varied by means of the slotted members 17 holding the guides to the table. To apply additional drag and assist in the expansion of the pack, as the side pressure is applied by the guides, a suitable cover 18 of canvas, metal or other material is placed on top of the pack and held against such pack by a weight or series of weights 19. Such plate or canvas is held to the frame by a rod 20. For some types of honeycomb, the addition to the guides 16 of endless belts 16a passing over rollers 16b, as shown in Figure 6, will facilitate the movement of the pack through the expanding unit.

The honeycomb pack is then fed from the expanding section between a steam heated table 21 on the bottom and a canvas conveyor felt 22 on the top. Such table is made up of a series of cored out plates fed by steam passing through the core. The conveyor felt 22 passes around rollers 25, which rollers are adjustably secured to the frame member so that the conveyor felt may be raised and lowered for packs of different thickness. Such felt is held against the pack by a series of small rollers 26 supported by frame members. The feed rollers 11 and 12 rotate at a slower speed than the conveyor felt 22 and rollers 25 thereby effecting a stretching action between the feed rollers of the compression section and the conveyor felt of the expanding section. In most cases and particularly where a resin impregnated pack is used, such pack, when fed into the machine, is stiff and resists expansion. Such resistance during the stretching action between the compression unit and the conveyor felt of the expanding unit first manifests itself as the pack passes over the carry roll 13 and then as the pack continues its path and is steamed by the jets 14. It is conditioned and softened and is thereby ready for stretching to the desired size as it passes under the guide roll 15. Consequently, most of the stretching is effected between such guide roll 15 and the conveyor felt 22. Such stretching or expansion is also assisted by the side pressure applied as the pack passes between the converging guides 16. By using the felt, the pull can be distributed over a larger area and it requires less pressure than would be required with merely a single pair of rolls. Furthermore, the even distribution of pressure over the entire area of the pack afforded by the felt 22 avoids any danger of applying excess pressure and consequent damage to the edges of the honeycomb cells while in a softened and conditioned state. In honeycomb packs which are not too thick and which do not offer too much resistance, it will be possible to use only a single pair of rolls, preferably rubber, instead of the felt.

Some types of honeycomb by reason of cell size or resin content offer less resistance to expansion, in which case it may be possible to adequately expand the pack merely by a stretching action without employing the previously described carry roll and steam. In such case the pack passes directly from the feed rolls 11 and 12 to the side pressure guides 16 of the expanding unit.

From the expanding unit the conditioned and expanded honeycomb material passes onto a table made up of a series of parallel bars running in the direction of movement and into a dryer 28. Such dryer may be of conventional form and serves to dry out and set the honeycomb material in expanded form. To insure passage of the pack through the dryer, a sprocket chain 29 with spaced pins 30 to engage the holes in the pack is run through the dryer and passes over suitable sprockets 31.

From the dryer the expanded honeycomb material moves to a facing unit, where sheets or faces may be applied to one or both sides of the core. An adhesive is first applied to one or both faces of the honeycomb material by passing it between a pair of applicator rolls 32 (steel or rubber) which are part of conventional glue spreaders. In addition to the applicator roll such glue spreader is made up of doctor rolls 33, which permit the adhesive held between plates 34 to be regulated. The adhesive is fed between the rolls 32 and 33 from a receptacle 35 provided with a hand valve 36 and spout 37. The facing material 38 is fed from stock rolls 39 over guide rolls 40. Such facing materials meets the adhesively coated expanded honeycomb material on the upper and lower faces from whence it runs into the drying end of a conventional corrugator 41. In some cases it is desirable to coat the facing material rather than the core. In this case paste applicators are placed in position to contact the material before it reaches the core. Such conventional corrugator is made up of a carrying felt 42, which passes over drive rolls 43 and under pressure rolls 44, and a hot plate 45. This corrugating unit bonds the sheet material to one or both faces of the honeycomb pack.

The end of the machine is provided with slitters 46 which cut the faced honeycomb material longitudinally into the desired width and also with a cut-off knife 47 which cuts the material transversely to the desired length (see Figure 5). These slitting and cutting operations are performed, as are all the other steps, during the continuous movement of the material through the machine. The pieces may then be carried by a conveyor and suitably stacked.

The operation of the invention will be apparent from the foregoing description. Since certain changes in carrying out the above process and in the construction set forth, which embody the invention, may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. The method of making honeycomb material which comprises providing a continuous unexpanded cellular pack of uniform thickness, applying pressure against the cell ends at two spaced positions and advancing the pack at a higher rate of speed at the second position than at the first to effect a stretching action between positions, applying pressure against the sides of the pack while it is maintained in a single plane and as it advances from the first position to the second to compress the pack to a predetermined width, which stretching and side pressure open the pack into a continuous expanded honeycomb material.

2. A method according to claim 1 wherein the expanded honeycomb material is subjected to heat to dry and set the material in expanded form.

3. A method according to claim 1 wherein the expanded honeycomb material is cut to size during the continuous movement thereof.

4. A method according to claim 1 wherein the pack between the first and second positions and in advance of the application of side pressure is subjected to steam to soften the pack for expansion.

5. A method according to claim 1 wherein the pack between the first and second positions and in advance of the application of side pressure is moved over a curved path to expose the cells and steam is blown against such exposed cells to open the cells further.

6. A method according to claim 1 wherein the expanded honeycomb material is faced with sheets on one or both sides during the continuous movement thereof.

7. A method according to claim 6 wherein the expanded faced honeycomb material is cut to the desired size during the continuous movement thereof.

8. The method of making honeycomb material which comprises providing a series of unexpanded honeycomb packs all of the same cell length, applying adhesive to end faces of the packs and joining successive packs into a continuous pack of uniform thickness, applying pressure against the cell ends at two spaced positions and advancing the pack at a higher rate of speed at the second position than at the first to effect a stretching action between positions, applying pressure against the sides of the pack while it is maintained in a single plane and as it advances from the first position to the second to compress the pack to a predetermined width, which stretching and side pressure open the pack into a continuous expanded honeycomb material.

9. The method of making honeycomb material which comprises joining successively the end faces of a series of unexpanded honeycomb packs, all of the same cell length, into a continuous pack of uniform thickness, applying pressure against the cell ends at a first position and advancing the pack at a fixed rate of speed, applying pressure against the cell ends at a second position spaced from the first and advancing the pack at a higher rate of speed, whereby there is effected a stretching action between positions, applying pressure against the sides of the pack while it is maintained in a single plane and as it advances from the first position to the second to compress the pack to a predetermined width, which stretching and side pressure open the pack into a continuous expanded honeycomb material.

10. The method of making honeycomb material which comprises providing a continuous unexpanded cellular pack of uniform thickness made up of generally flat stacked superimposed sheets of paper held together along spaced and generally parallel lines with the lines on one side of each sheet positioned between the lines on the other side of such sheet, applying pressure against the ends of the sheets at two spaced positions and advancing the pack at a higher rate of speed at the second position than at the first to effect a stretching action between positions, applying pressure against the ends of the sheets while the pack is maintained in a single plane and as it advances from the first position to the second and compressing the sheets to a predetermined length, which stretching, pressure and compression distort the sheets into cellular form and open the pack into a continuous expanded honeycomb material.

References Cited in the file of this patent

UNITED STATES PATENTS

| | | |
|---|---|---|
| 2,106,967 | Cross | Feb. 1, 1938 |
| 2,428,979 | May | Oct. 14, 1947 |
| 2,553,054 | Lincoln et al. | May 15, 1951 |
| 2,581,421 | Lombard et al. | Jan. 8, 1952 |
| 2,588,859 | Lumbard | Mar. 11, 1952 |
| 2,609,320 | Modigliani | Sept. 2, 1952 |
| 2,636,540 | Lincoln | Apr. 28, 1953 |
| 2,670,026 | Ungar | Feb. 23, 1954 |